United States Patent
Yu

(10) Patent No.: US 11,724,698 B2
(45) Date of Patent: *Aug. 15, 2023

(54) SYSTEMS AND METHODS OF ADJUSTING OPERATING PARAMETERS OF A VEHICLE BASED ON VEHICLE DUTY CYCLES

(71) Applicant: Cummins Inc., Columbus, IN (US)

(72) Inventor: Chia-Siung Yu, Bloomington, IN (US)

(73) Assignee: Cummins Inc., Columbus, IN (US)

(*) Notice: Subject to any disclaimer, the term of this patent is extended or adjusted under 35 U.S.C. 154(b) by 32 days.

This patent is subject to a terminal disclaimer.

(21) Appl. No.: 17/315,713

(22) Filed: May 10, 2021

(65) Prior Publication Data

US 2021/0269033 A1    Sep. 2, 2021

Related U.S. Application Data

(63) Continuation of application No. 16/080,531, filed as application No. PCT/US2017/023190 on Mar. 20, 2017, now Pat. No. 11,001,265.

(Continued)

(51) Int. Cl.
*B60W 30/188*  (2012.01)
*F02B 3/06*  (2006.01)
(Continued)

(52) U.S. Cl.
CPC ...... *B60W 30/1882* (2013.01); *B60W 30/188* (2013.01); *B60W 50/14* (2013.01);
(Continued)

(58) Field of Classification Search
CPC .......... B60W 30/1882; B60W 30/188; B60W 50/14; B60W 2050/146; B60W 2300/17;
(Continued)

(56) References Cited

U.S. PATENT DOCUMENTS

| 4,078,531 A | 3/1978 | Hewitt |
| 4,181,103 A | 1/1980 | Sturdy |

(Continued)

FOREIGN PATENT DOCUMENTS

| BR | 6601442 | 4/1988 |
| CN | 102713224 | 10/2012 |

(Continued)

OTHER PUBLICATIONS

International Search Report and Written Opinion for International Application No. PCT/US2017/023190, dated May 26, 2017, 10 pages.

(Continued)

*Primary Examiner* — Donald J Wallace
*Assistant Examiner* — Jalal C Coduroglu
(74) *Attorney, Agent, or Firm* — Foley & Lardner LLP

(57) ABSTRACT

A method includes: receiving, by a controller of a vehicle, operation data indicative of a duty cycle for the vehicle, wherein the duty cycle is a substantially repeatable set of vehicle or vehicle component operations for a particular event or for a predefined time period; identifying, by the controller, a desired vehicle duty cycle from a population of vehicle duty cycles based on the operation data indicative of the duty cycle for the vehicle and on a desired operating parameter of the vehicle; receiving, by the controller, a set of trim parameters that are electronic operational parameters associated with the desired vehicle duty cycle; and controlling, by the controller, one or more operating points of the vehicle based on the set of trim parameters.

20 Claims, 7 Drawing Sheets

Related U.S. Application Data

(60) Provisional application No. 62/313,469, filed on Mar. 25, 2016.

(51) Int. Cl.

| | |
|---|---|
| *G07C 5/00* | (2006.01) |
| *F01P 7/08* | (2006.01) |
| *F01P 7/04* | (2006.01) |
| *B60W 50/14* | (2020.01) |
| *F02N 11/08* | (2006.01) |
| *F02D 17/04* | (2006.01) |

(52) U.S. Cl.
CPC .................. *F01P 7/04* (2013.01); *F01P 7/08* (2013.01); *F02B 3/06* (2013.01); *G07C 5/00* (2013.01); *B60W 2050/146* (2013.01); *B60W 2300/17* (2013.01); *B60W 2520/10* (2013.01); *B60W 2520/105* (2013.01); *B60Y 2200/41* (2013.01); *B60Y 2300/52* (2013.01); *F02D 17/04* (2013.01); *F02N 11/0803* (2013.01)

(58) Field of Classification Search
CPC ....... B60W 2520/10; B60W 2520/105; B60W 2556/45; B60W 40/12; F01P 7/04; F01P 7/08; F01P 7/048; F02B 3/06; G07C 5/00; B60Y 2200/41; B60Y 2300/52; F02D 17/04; F02D 31/00; F02N 11/0803; B60K 31/00; B60K 31/042; B60K 2031/0091
See application file for complete search history.

(56) References Cited

U.S. PATENT DOCUMENTS

| | | | |
|---|---|---|---|
| 4,595,885 A | 6/1986 | Prieto et al. | |
| 4,604,568 A | 8/1986 | Prieto | |
| 4,628,272 A | 12/1986 | Davis et al. | |
| 4,778,226 A | 10/1988 | Brown | |
| 5,097,180 A | 3/1992 | Ignon | |
| 5,445,128 A | 8/1995 | Letang et al. | |
| 5,570,666 A | 11/1996 | Rymut et al. | |
| 5,754,965 A * | 5/1998 | Hagenbuch | G07C 5/008 701/33.9 |
| 6,081,576 A | 6/2000 | Schanen et al. | |
| 6,198,791 B1 | 3/2001 | He et al. | |
| 6,295,500 B1 | 9/2001 | Cullen et al. | |
| 6,304,809 B1 | 10/2001 | Cullen et al. | |
| 6,363,314 B1 | 3/2002 | Hafner et al. | |
| 6,601,442 B1 | 8/2003 | Decker et al. | |
| 6,760,659 B1 | 7/2004 | Cowen | |
| 6,952,642 B1 * | 10/2005 | Cowen | F02D 41/2422 123/367 |
| 7,162,339 B2 | 1/2007 | Nguyen | |
| 7,182,711 B2 * | 2/2007 | Cullen | F02D 41/2422 123/367 |
| 7,200,476 B2 | 4/2007 | Cawthorne | |
| 7,295,925 B2 | 11/2007 | Breed et al. | |
| 7,366,589 B2 | 4/2008 | Habermas | |
| 7,759,672 B2 | 7/2010 | Bugge | |
| 7,788,008 B2 | 8/2010 | Breed | |
| 7,881,032 B2 | 2/2011 | Balakrishnan et al. | |
| 7,899,610 B2 | 3/2011 | McClellan | |
| 7,937,923 B2 | 5/2011 | Biziorek | |
| 8,000,897 B2 | 8/2011 | Breed et al. | |
| 8,011,295 B1 | 9/2011 | Smith | |
| 8,138,810 B2 | 3/2012 | Wang | |
| 8,374,766 B2 * | 2/2013 | Chisholm | G05D 1/0274 340/901 |
| 8,587,367 B1 | 11/2013 | Pan | |
| 8,724,904 B2 | 5/2014 | Fujiki et al. | |
| 8,751,100 B2 | 6/2014 | Johnson et al. | |
| 8,781,664 B2 | 7/2014 | Sujan et al. | |
| 8,813,690 B2 * | 8/2014 | Kumar | F02D 19/088 60/274 |
| 8,862,346 B2 | 10/2014 | Saltsman et al. | |
| 8,896,430 B2 | 11/2014 | Davidson et al. | |
| 8,914,184 B2 | 12/2014 | McQuade et al. | |
| 8,949,008 B2 | 2/2015 | Krengiel | |
| 8,965,677 B2 | 2/2015 | Breed et al. | |
| 9,043,061 B2 * | 5/2015 | Sujan | F02D 19/088 60/274 |
| 9,251,891 B1 | 2/2016 | Hu et al. | |
| 9,609,803 B2 | 4/2017 | Gervais et al. | |
| 9,930,834 B2 | 4/2018 | Chaney et al. | |
| 9,949,438 B2 | 4/2018 | Smith | |
| 10,011,213 B1 * | 7/2018 | Palmer | G07C 5/008 |
| 10,128,836 B1 * | 11/2018 | Buttolo | H03K 17/955 |
| 11,091,142 B2 * | 8/2021 | Remington | B60K 25/02 |
| 2002/0112347 A1 * | 8/2002 | Balakrishnan | H05K 3/225 29/846 |
| 2004/0199890 A1 | 10/2004 | Segami | |
| 2007/0129878 A1 | 6/2007 | Pepper | |
| 2008/0133136 A1 * | 6/2008 | Breed | G05D 1/0274 340/901 |
| 2010/0118209 A1 | 5/2010 | Hardacker | |
| 2010/0215510 A1 | 8/2010 | Tsai et al. | |
| 2011/0096332 A1 | 4/2011 | Bugge | |
| 2013/0090988 A1 | 4/2013 | Moore et al. | |
| 2013/0097182 A1 | 4/2013 | He | |
| 2013/0116856 A1 * | 5/2013 | Schadeck | G05D 1/0274 340/901 |
| 2013/0184909 A1 | 7/2013 | Sujan et al. | |
| 2014/0014188 A1 | 1/2014 | Szydlowski et al. | |
| 2014/0030712 A1 | 1/2014 | Zechiedrich et al. | |
| 2014/0244643 A1 | 8/2014 | Basak et al. | |
| 2014/0304267 A1 | 10/2014 | Deng et al. | |
| 2015/0115936 A1 | 4/2015 | Pratap | |
| 2015/0134156 A1 * | 5/2015 | Henry | F02D 19/088 60/274 |
| 2015/0203887 A1 | 7/2015 | Lazinski et al. | |
| 2015/0210268 A1 * | 7/2015 | Yang | H05K 3/225 29/846 |
| 2015/0210283 A1 * | 7/2015 | Young | F02D 19/088 60/274 |
| 2015/0213614 A1 | 7/2015 | Maddah et al. | |
| 2015/0234603 A1 | 8/2015 | Kitagawa et al. | |
| 2015/0280608 A1 | 10/2015 | Yoscovich et al. | |
| 2015/0314776 A1 * | 11/2015 | Yu | G05D 1/0274 340/901 |
| 2015/0324148 A1 | 11/2015 | Achtenberg et al. | |
| 2015/0370556 A1 | 12/2015 | Strosaker | |
| 2016/0016525 A1 | 1/2016 | Chauncey et al. | |
| 2016/0052505 A1 | 2/2016 | Zhou | |
| 2016/0124009 A1 | 5/2016 | Wasson et al. | |
| 2016/0163130 A1 | 6/2016 | Zagajac et al. | |
| 2017/0057680 A1 | 3/2017 | Schlichting | |
| 2019/0016337 A1 * | 1/2019 | Yu | B60W 30/1882 |
| 2019/0045717 A1 | 2/2019 | Talsma et al. | |
| 2019/0098840 A1 | 4/2019 | Kraus | |
| 2019/0339688 A1 | 11/2019 | Cella et al. | |
| 2020/0113136 A1 | 4/2020 | Eubanks et al. | |
| 2020/0196515 A1 | 6/2020 | Engel | |
| 2021/0092019 A1 * | 3/2021 | Fang | H04L 41/28 |
| 2021/0192867 A1 * | 6/2021 | Fang | G07C 5/008 |
| 2021/0304009 A1 * | 9/2021 | Bazarsky | G06N 3/06 |
| 2021/0335061 A1 * | 10/2021 | Claessens | G07C 5/0808 |
| 2021/0335062 A1 * | 10/2021 | Claessens | G07C 5/008 |
| 2021/0405893 A1 * | 12/2021 | Agarwal | G06F 3/0659 |

FOREIGN PATENT DOCUMENTS

| | | |
|---|---|---|
| DE | 41 22 773 | 12/1999 |
| DE | 44 46 120 | 3/2005 |
| DE | 10 2007 037 831 | 4/2008 |
| DE | 10 2011 106 356 | 1/2012 |
| DE | 10 2011 085 325 | 5/2013 |
| DE | 10 2015 207 874 | 11/2015 |
| EP | 1 057 680 | 12/2000 |
| EP | 2 591 969 | 5/2013 |
| EP | 2 340 976 | 12/2014 |

(56) References Cited

FOREIGN PATENT DOCUMENTS

| | | |
|---|---|---|
| GB | 2 368 406 | 10/2004 |
| GB | 2 516 035 | 3/2017 |
| JP | 2018-140054 | 9/2018 |
| KR | 20150075102 | 7/2015 |
| KR | 20160052505 | 5/2016 |
| WO | WO-2005/073010 | 8/2005 |
| WO | WO-2010/030341 | 3/2010 |
| WO | WO-2012/097349 | 7/2012 |
| WO | WO-2013/117309 | 8/2013 |

OTHER PUBLICATIONS

Chinese Office Action on CN App. No. 202110945143X dated Apr. 15, 2023, with English translation.

* cited by examiner

SYSTEMS AND METHODS OF ADJUSTING OPERATING PARAMETERS OF A VEHICLE BASED ON VEHICLE DUTY CYCLES

CROSS-REFERENCE TO RELATED PATENT APPLICATIONS

This application is a continuation of U.S. patent application Ser. No. 16/080,531, filed Aug. 28, 2018, entitled "SYSTEMS AND METHODS OF ADJUSTING OPERATING PARAMETERS OF A VEHICLE BASED ON VEHICLE DUTY CYCLES," which is a U.S. national stage filing of PCT/US2017/023190, filed Mar. 20, 2017, entitled "SYSTEMS AND METHODS OF ADJUSTING OPERATING PARAMETERS OF A VEHICLE BASED ON VEHICLE DUTY CYCLES," which claims the benefit of U.S. Provisional Patent Application No. 62/313,469, filed Mar. 25, 2016, entitled "SYSTEMS AND METHODS OF ADJUSTING OPERATING PARAMETERS OF A VEHICLE BASED ON VEHICLE DUTY CYCLES," all of which are incorporated herein by reference in their entireties.

TECHNICAL FIELD

The present disclosure relates to control strategies for adjusting vehicle operating parameters.

BACKGROUND

In a vehicle, the powertrain or powertrain system refers to the components that provide the power to propel the vehicle. These components include the engine, transmission, drive/propeller shaft, differentials, and final drive. In operation and for an internal combustion engine, the engine combusts a fuel to generate mechanical power in the form of a rotating a crankshaft. The transmission receives the rotating crankshaft and manipulates the engine speed (i.e., the rotation of the crankshaft) to control a rotation speed of the drive/propeller shaft, which is also coupled to the transmission. The rotating drive shaft is received by a differential, which transmits the rotational power to a final drive (e.g., wheels) to effect a movement of the vehicle. In an automobile, the differential enables the wheels, on a shared axle, to rotate at different speeds (e.g., during a turn, the outer wheel spins faster relative to the inner wheel to allow the vehicle to maintain its speed and line of travel).

Typically, many vehicular control systems utilize one or more operating parameters that affect or control certain aspects of vehicular operation. For example, an upper droop setting may define how much a vehicle is allowed to decrease speed relative to a cruise control set speed during an uphill excursion. However, these operating parameters are typically set by default. As such, various operating parameter settings may not provide the desired performance for many operators (e.g., to minimize fuel consumption).

SUMMARY

One embodiment relates to an apparatus. The apparatus includes a trim parameter circuit structured to receive a set of default trim parameters intended to control one or more operating points of a vehicle, and a vehicle duty cycle circuit operatively coupled to the trim parameter circuit. According to one embodiment, the vehicle duty circuit is structured to: receive operation data indicative of a duty cycle for the vehicle; determine one or more vehicle duty cycles for the vehicle based on the operation data; compare the determined one or more vehicle duty cycles to a population of vehicle duty cycles; identify a desired vehicle duty cycle from the population of vehicle duty cycles for each of the one or more identified vehicle duty cycles based on a desired operating parameter of the vehicle; receive a set of trim parameters associated with each desired vehicle duty cycle; and selectively apply the set of trim parameters with the vehicle to control the one or more operating points of the vehicle in accordance with the desired operating parameter of the vehicle.

Another embodiment relates to method. The method includes receiving, by a controller of an engine of a vehicle, operation data indicative of a duty cycle for the vehicle; determining, by the controller, one or more vehicle duty cycles for the vehicle based on the operation data; comparing, by the controller, the determined one or more vehicle duty cycles to a population of vehicle duty cycles; identifying, by the controller, a desired vehicle duty cycle from the population of vehicle duty cycles for each of the one or more determined vehicle duty cycles based on a desired operating parameter of the vehicle; receiving, by the controller, a set of trim parameters associated with each desired vehicle duty cycle; and selectively applying, by the controller, the set of trim parameters with the vehicle to control the one or more operating points of the vehicle in accordance with the desired operating parameter of the vehicle.

Yet another embodiment relates to a vehicle. The vehicle includes an engine, and a controller operatively coupled to the engine. According to one embodiment, the controller is structured to: receive operation data indicative of a duty cycle for the vehicle; determine one or more vehicle duty cycles for the vehicle based on the operation data; compare the determined one or more vehicle duty cycles to a population of vehicle duty cycles; identify a desired vehicle duty cycle from the population of vehicle duty cycles for each of the one or more determined vehicle duty cycles based on a desired operating parameter of the vehicle; receive a set of trim parameters associated with each desired vehicle duty cycle; and selectively apply the set of trim parameters with the vehicle to control the one or more operating points of the vehicle in accordance with the desired operating parameter of the vehicle.

These and other features, together with the organization and manner of operation thereof, will become apparent from the following detailed description when taken in conjunction with the accompanying drawings.

DETAILED DESCRIPTION OF VARIOUS EMBODIMENTS

Figure 1:
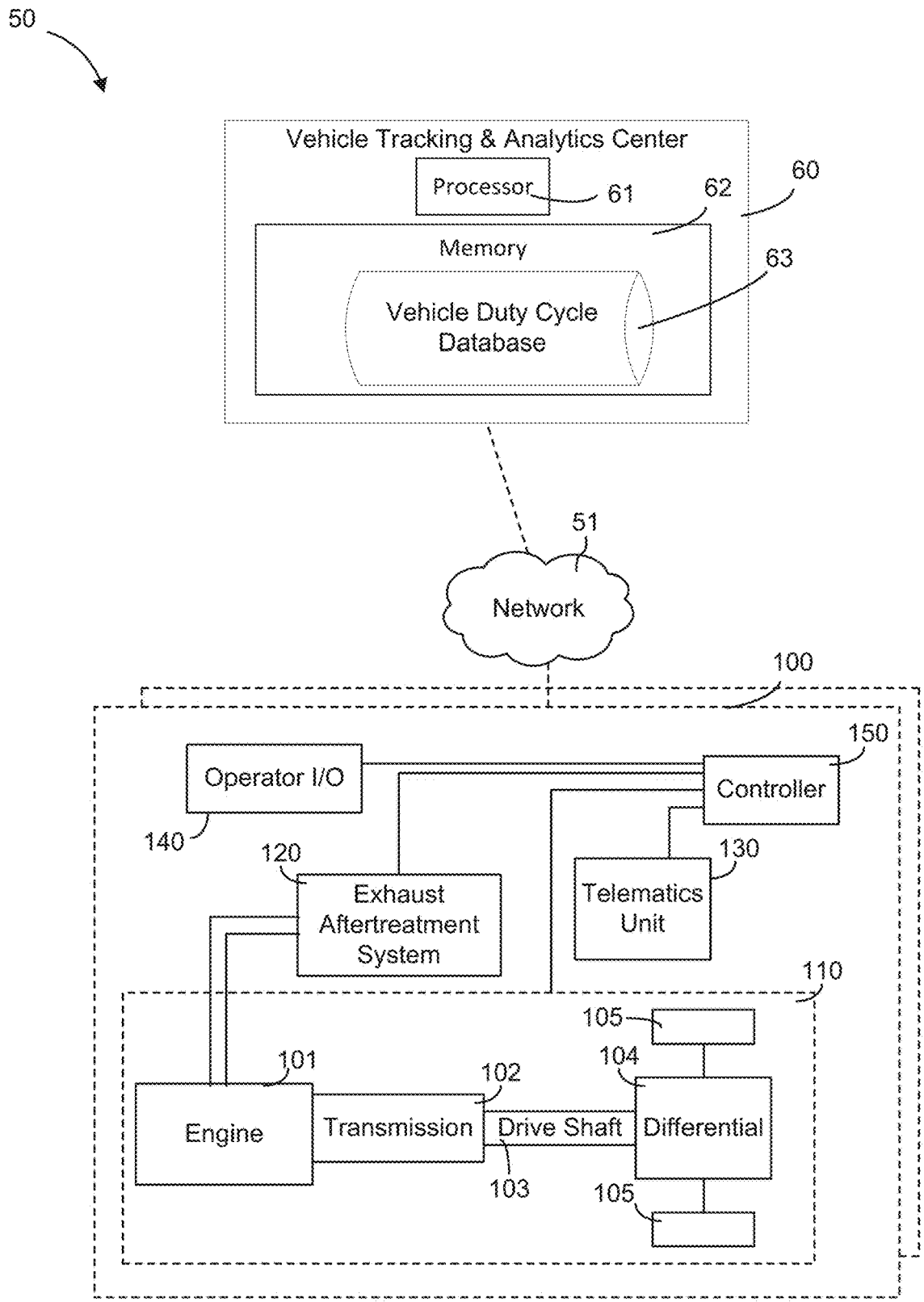
FIG. 1 is a schematic diagram of an intelligent transportation system, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems, methods, and apparatuses structured to selectively adjust electronic control parameters for a vehicle based on a determined vehicle duty cycle for the vehicle compared to a population of vehicle duty cycles, and selectively adjusting the electronic control parameters to coincide with the control parameters associated with an identified desired vehicle duty cycle from the population of vehicle duty cycles. Currently, various electronic control parameters are provided as default operating parameters for a vehicle (e.g., cruise control droop settings, a road speed governor setting, etc.). In some instances, a technician (and in certain configurations, a user) may adjust one or more of these default electronic control parameters. For example, the technician may alter the upper droop setting to promote fuel economy by allowing the vehicle to decrease speed by three (3) miles-per-hour relative to the cruise control set speed. Alternatively, the technician may set the upper droop setting to zero (0) MPH to promote performance (i.e., no decrease in speed in an uphill situation). However, such manipulations may require an operator of the vehicle to visit a technician, which takes time and may be costly, and may further fail to or substantially fail to account for how the particular operator operates the vehicle. In this regard, the adjustments of the electronic default control parameters may be independent of the actual usage of the vehicle, which, in turn, may limit the effectiveness of such adjustments.

According to the present disclosure, a controller may interpret data regarding operation of the vehicle to determine a duty cycle(s) of the vehicle. Responsive to the determination of the duty cycle(s), the controller may receive a desired characteristic for one or more operating parameters of the vehicle (e.g., minimize fuel consumption, maximize performance (e.g., power), minimize the number of fueling stops, etc.) (referred to as the desired operating parameter). Based on the desired operating parameter, the controller may identify duty cycles from a population of vehicle duty cycles (e.g., from a fleet of vehicles) that correspond or substantially correspond with the desired operating parameter (e.g., duty cycles that minimize fuel consumption). After identification, the controller may request and receive electronic control parameter information indicative of the control parameters associated with the identified desired vehicle duty cycle(s). The controller may then selectively and automatically adjust the control parameters of the vehicle to coincide or substantially coincide with the received control parameters. Beneficially, the vehicle may then mimic or potentially mimic performance of the vehicle with a desired duty cycle. Accordingly, the operator may realize performance of their vehicle that may be closer to their desired operating parameters, such as improving fuel economy. Further, such actions may be accomplished without the operator needing to visit a technician to implement the adjustments to the electronic control parameters. In this regard, the controller facilitates automatic electronic parameter adjustment in contrast to a normal or routine manner and, further, improves operation of the vehicle responsive to the specific operating characteristics of the vehicle. These and other features and benefits of the present disclosure are described more fully herein below.

As used herein, the term "vehicle duty cycle" or "duty cycle" refers to data, values, or information indicative of how the specific vehicle is being utilized for a particular application. In particular, a "duty cycle" refers to a repeatable set of vehicle operations for a particular event or for a predefined time period. For example, a "duty cycle" may refer to values indicative of a vehicle speed for a given time period. In another example, a "duty cycle" may refer to values indicative of an aerodynamic load on the vehicle for a given time period. In yet another example, a "duty cycle" may refer to values indicative of a vehicle speed and an elevation of a vehicle for a given time period. In this regard and compared to a vehicle drive cycle, which is typically limited to time versus speed information, the term "duty cycle" as used herein is meant to be broadly interpreted and inclusive of vehicle drive cycles among other quantifiable metrics. Beneficially and based on the foregoing, the "duty cycle" may be representative of how a vehicle may operate in a particular setting, circumstance, and/or environment (e.g., a seventy-file mile stretch of a relatively flat freeway environment, etc.). In this regard, the vehicle duty cycle may vary greatly based on the vehicle (e.g., a two-door sedan vehicle versus a concrete mixer truck versus a refuse truck versus a semi-tractor trailer vehicle, etc.). Accordingly and as described herein, the present disclosure may utilize systems and methods to identify pertinent duty cycles for a particular vehicle.

It should be understood that while the present disclosure describes the duty cycle on a per unit time basis, this description is not meant to be limiting. The present disclosure contemplates other metrics that may be used to define the duty cycle. These metrics may include, but are not limited to, basing the duty cycle on distance, fuel consumption, etc. In this regard, a different basis for the duty cycle may be used based on the target application. Thus, the duty cycle basis is meant to be broadly interpreted under the present disclosure.

It should be understood that while the "duty cycle" is described primarily herein in regard to the vehicle, this designation is not meant to be limiting. Rather, the duty cycle may be identified on a component level as well. For example, a component duty cycle may be the engine speed for a given time period. As another example, a component duty cycle may be the number of shift events for a transmission for a given time period. As still another example, a component duty cycle may be values indicative of a temperature (e.g., maximum, average, etc.) in an exhaust aftertreatment system for a given time period (e.g., to track regeneration events, etc.). In yet another example, a component duty cycle may be operation data for a combination of individual components of a vehicle for a given time period (e.g., engine speed and aerodynamic load for a given time period, etc.). Thus and as used herein, the term "duty cycle" is meant to be broadly interpreted.

As also used herein, the terms "electronic control parameters," "operating parameters," and "trim parameters" are used interchangeably and refer to electronic operational settings for a vehicle or components thereof that may be adjustable by an operator or a technician of the vehicle. In comparison, a "calibration parameter" or "calibration setting" is typically a setting that is non-adjustable by either the operator or a technician of the vehicle. An example of a calibration parameter is an allowable engine temperature for a given time period before causing at least one or both of shutting the engine down and triggering an indicator light. Another example of a calibration parameter may include an operating condition prescribed by a local, state, or federal mandate (e.g., an acceptable emissions level before causing an engine derate condition, etc.). In comparison, a non-exhaustive list of trim parameters includes: various parameters relating to cruise control (e.g., an upper droop amount, a lower droop amount, etc.); a road speed governor limit (i.e., the maximum allowable road speed of the vehicle); an idle shut down parameter (e.g., an amount of time before an idle engine shuts down, etc.); a load based speed control parameter (e.g., a predefined engine speed for certain operating conditions, such as load, etc.); a gear down protection parameter for a light load vehicle speed and a heavy load vehicle speed (e.g., maintain the vehicle in the light load or heavy load vehicle speed to promote increased fuel economy by minimizing downshifts to promote operation of the vehicle in a top gear, etc.); and a vehicle acceleration management feature (e.g., to limit acceleration in certain conditions to improve fuel economy, etc.). Of course, the present disclosure contemplates various other trim parameters that may be applicable in certain vehicle and engine systems.

Referring now to FIG. 1, a schematic diagram of an intelligent transportation system (ITS) 50 is shown according to one embodiment. The ITS 50 is structured to provide an environment that facilitates and allows the exchange of information or data (e.g., communications, etc.) between a vehicle, such as vehicle 100, and one or more other components or sources. In this regard and for example, the ITS 50 may include telematics systems that facilitate the acquisition and transmission of data acquired regarding the operation of the vehicle 100. As shown and generally speaking, the ITS 50 includes one or more vehicles, with a representative vehicle shown as vehicle 100, communicably coupled via a network 51 to a vehicle tracking and analytics center 60.

The network 51 may be any type of communication protocol that facilitates the exchange of information between and among the vehicle 100 and the vehicle tracking and analytics center 60. In this regard, the network 51 may communicably couple the vehicle 100 with the vehicle tracking and analytics center 60. In one embodiment, the network 51 may be configured as a wireless network. In this regard, the vehicle 100 may wirelessly transmit and receive data from the vehicle tracking and analytics center 60. The wireless network may be any type of wireless network, such as Wi-Fi, WiMax, Geographical Information System (GIS), Internet, Radio, Bluetooth, Zigbee, satellite, radio, Cellular, Global System for Mobile Communications (GSM), General Packet Radio Service (GPRS), Long Term Evolution (LTE), light signaling, etc. In an alternate embodiment, the network 51 may be configured as a wired network or a combination of wired and wireless protocol. For example, the controller 150 and/or telematics unit 130 of the vehicle 100 may electrically, communicably, and/or operatively couple via a communication cable, such as a fiber optic cable, to the network 51 to selectively transmit and receive data wirelessly to and from the vehicle tracking and analytics center 60.

The vehicle tracking and analytics center 60 may be any remote data collection and analytics center relative to the vehicle 100. As shown, the vehicle tracking and analytics center 60 may include a processor 61 and a memory device 62, where the memory device 62 may include a vehicle duty cycle database 63. The processor 61 may be structured to selectively execute instructions, commands, and the like stored by the memory device 62. Accordingly, the processor 61 may include one or more processors that may or may not be geographically dispersed, such that the vehicle tracking and analytics center 60 may include multiple different geographic locations. As such, the processor 61 may be implemented as a general-purpose processor, an application specific integrated circuit (ASIC), one or more field programmable gate arrays (FPGAs), a digital signal processor (DSP), a group of processing components like mentioned above, or any other suitable electronic processing components. The one or more memory devices 62 (e.g., NVRAM, RAM, ROM, Flash Memory, hard disk storage, etc.) may store data and/or computer code for facilitating the various processes described herein. Accordingly, the one or more memory devices 62 may be or include tangible, non-transient volatile memory or non-volatile memory.

In operation and as alluded to above, the vehicle tracking and analytics center 60 may be structured as multiple remote locations. The remote locations may serve as a call center or as a fleet management center to instruct, command, and/or otherwise communicate with one or more of the vehicles 100. Accordingly, multiple attendants or managers may communicate via the vehicle tracking and analytics center 60 through the network 51 with one or more designated or identified vehicles 100 to, e.g., inform an operator of the vehicle 100 of an upcoming condition (e.g., a change in freight loading/unloading location, an upcoming accident to use an alternate route, etc.).

In another embodiment, the vehicle tracking and analytics center 60 may be structured as a subscription service useable with the telematics unit 130. Accordingly, operators of one or more vehicles 100 may choose to enroll with the service to receive pertinent updates, such as changes in freight loading/unloading locations. Thus, the vehicle tracking and analytics center 60 is meant to be broadly interrupted herein to refer to any remote location that may communicate with the vehicle 100.

As mentioned above, the memory 62 may include a vehicle duty cycle database 63. The vehicle duty cycle database 63 may store, classify, categorize, and/or otherwise serve as a repository for vehicle duty cycles associated with a plurality of a vehicles and any information associated with each vehicle duty cycle, such as corresponding trim parameters and operating characteristics associated with each duty cycle (e.g., a fuel consumption rate, an emissions characteristic, engine temperatures/pressures, oil temperatures/pressures, engine speed, engine torque, etc.). Accordingly, the vehicle tracking and analytics center 60 may selectively provide information relating to one or more stored vehicle duty cycles responsive to receiving requests for same.

As shown in FIG. 1, multiple vehicles 100 may be communicably coupled over the network 51 to the vehicle tracking and analytics center 60. Accordingly, while only a single example vehicle is described herein, this description is not meant to be limiting.

As such, referring now to the vehicle 100 of FIG. 1, the vehicle 100 is communicably coupled to the vehicle tracking and analytics center 60 via the network 51. The vehicle 100 may be an on-road or an off-road vehicle including, but not limited to, line-haul trucks, mid-range trucks (e.g., pick-up truck), cars (e.g., sedans, coupes, etc.), motorcycles, tanks, airplanes, and any other type of vehicle that may communicate over a network, such as network 51, with one or more remote components, such as the vehicle tracking and analytics center 60. The vehicle 100 may be powered by any type of engine system. For example, the vehicle 100 may be any variation of a hybrid vehicle, a full electric vehicle, and/or an internal combustion engine powered vehicle as shown. Before delving into the particulars of the ITS 50 in regard to the vehicle 100, the various components of the vehicle 100 may be described as follows. The vehicle 100 is shown to generally include a powertrain system 110, an exhaust aftertreatment system 120, a telematics unit 130, an operator input/output device 140, and a controller 150, where the controller 150 is communicably coupled to each of the aforementioned components. Of course, this depiction is not meant to be limiting as the vehicle 100 may include any of a variety of other components, such as an electrically driven/controlled air compressor, an electrically driven/controlled engine cooling fan, an electrically driven/controlled heating venting and air conditioning system, an alternator, an energy storage device, etc., where the controllability may stem from the controller 150.

The powertrain system 110 facilitates power transfer from an engine 101 to power and/or propel the vehicle 100. The powertrain system 110 includes the engine 101 operably coupled to a transmission 102 that is operatively coupled to a drive shaft 103, which is operatively coupled to a differential 104, where the differential 104 transfers power output from the engine 101 to the final drive 105 (shown as wheels) to propel the vehicle 100. As a brief overview, the engine 101 receives a chemical energy input (e.g., a fuel such as gasoline, diesel, etc.) and combusts the fuel to generate mechanical energy, in the form of a rotating crankshaft. As a result of the power output from the engine 101, the transmission 102 may manipulate the speed of the rotating input shaft (e.g., the crankshaft) to effect a desired speed of the drive shaft 103. The rotating drive shaft 103 is received by a differential 104, which provides the rotation energy of the drive shaft 103 to the final drive 105. The final drive 105 then propels or moves the vehicle 100.

The engine 101 may be structured as any internal combustion engine (e.g., compression-ignition, spark-ignition, etc.), such that it can be powered by any fuel type (e.g., diesel, ethanol, gasoline, natural gas, propane, hydrogen, etc.). Similarly, the transmission 102 may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmission), the transmission can include a variety of settings (gears, for a geared transmission) that affect different output speeds based on the engine speed. Like the engine 101 and the transmission 102, the drive shaft 103, differential 104, and final drive 105 may be structured in any configuration dependent on the application (e.g., the final drive 105 is structured as wheels in an automotive application and a propeller in an airplane application). Further, the drive shaft 103 may be structured as a one-piece, two-piece, and a slip-in-tube driveshaft based on the application.

As also shown, the vehicle 100 includes an exhaust aftertreatment system 120 in fluid communication with the engine 101. The exhaust aftertreatment system 120 may receive exhaust gas from the combustion process in the engine 101 and transform/reduce the emissions from the engine 101 to less environmentally harmful emissions (e.g., reduce the NOx amount, reduce the emitted particulate matter amount, etc.). The exhaust aftertreatment system 120 may include any component used to reduce diesel exhaust emissions, such as a selective catalytic reduction catalyst, a diesel oxidation catalyst, a diesel particulate filter, a diesel exhaust fluid doser with a supply of diesel exhaust fluid, and a plurality of sensors for monitoring the system 120 (e.g., a NOx sensor, a temperature sensor, a particulate matter sensor, etc.). It should be understood that other embodiments may exclude an exhaust aftertreatment system and/or include different, less than, and/or additional components than that listed above. All such variations are intended to fall within the spirit and scope of the present disclosure.

The vehicle 100 is also shown to include a telematics unit 130. The telematics unit 130 may be structured as any type of telematics control unit. Accordingly, the telematics unit 130 may include, but is not limited to, a location positioning system (e.g., global positioning system, etc.) to track the location of the vehicle (e.g., latitude and longitude data, elevation data, etc.), one or more memory devices for storing the tracked data, one or more electronic processing units for processing the tracked data, and a communications interface for facilitating the exchange of data between the telematics unit 130 and one or more remote devices (e.g., a provider/manufacturer of the telematics device, etc.). In this regard, the communications interface may be configured as any type of mobile communications interface or protocol including, but not limited to, Wi-Fi, WiMax, Internet, Radio, Bluetooth, Zigbee, satellite, radio, Cellular, GSM, GPRS, LTE, and the like. The telematics unit 130 may also include a communications interface for communicating with the controller 150 of the vehicle 100. The communication interface for communicating with the controller 150 may include any type and number of wired and wireless protocols (e.g., any standard under IEEE 802, etc.). For example, a wired connection may include a serial cable, a fiber optic cable, an SAE J1939 bus, a CAT5 cable, or any other form of wired connection. In comparison, a wireless connection may include the Internet, Wi-Fi, Bluetooth, Zigbee, cellular, radio, etc. In one embodiment, a controller area network (CAN) bus including any number of wired and wireless connections provides the exchange of signals, information, and/or data between the controller 150 and the telematics unit 130. In other embodiments, a local area network (LAN), a wide area network (WAN), or an external computer (for example, through the Internet using an Internet Service Provider) may provide, facilitate, and support communication between the telematics unit 130 and the controller 150. In still another embodiment, the communication between the telematics unit 130 and the controller 150 is via the unified diagnostic services (UDS) protocol. All such variations are intended to fall within the spirit and scope of the present disclosure.

The operator input/output device 140 enables an operator of the vehicle to communicate with the vehicle 100 and the controller 150. For example, the operator input/output device 140 may include, but is not limited, an interactive display (e.g., a touchscreen, etc.), an accelerator pedal, a clutch pedal, a shifter for the transmission 102, a cruise control input setting, etc. Via the operator input/output device 140, the operator can designate preferred characteristics of one or more desired operating parameters (e.g., an upper cruise control droop amount, etc.).

As shown in FIG. 1, the controller 150 is communicably and operatively coupled to the powertrain system 110, the exhaust aftertreatment system 120, the telematics unit 130, and the operator input/output device 140. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a CAN bus provides the exchange of signals, information, and/or data. The CAN bus includes any number of wired and wireless connections. Because the controller 150 is communicably coupled to the systems and components in the vehicle 100 of FIG. 1, the controller 150 is structured to receive data (e.g., instructions, commands, signals, values, etc.) from one or more of the components shown in FIG. 1.

Because the components of FIG. 1 are shown to be embodied in a vehicle 100, the controller 150 may be structured as an electronic control module (ECM). The ECM may include a transmission control unit and any other control unit included in a vehicle (e.g., exhaust aftertreatment control unit, engine control module, powertrain control module, etc.). The function and structure of the controller 150 are shown described in greater detail in FIG. 2.

Figure 2:
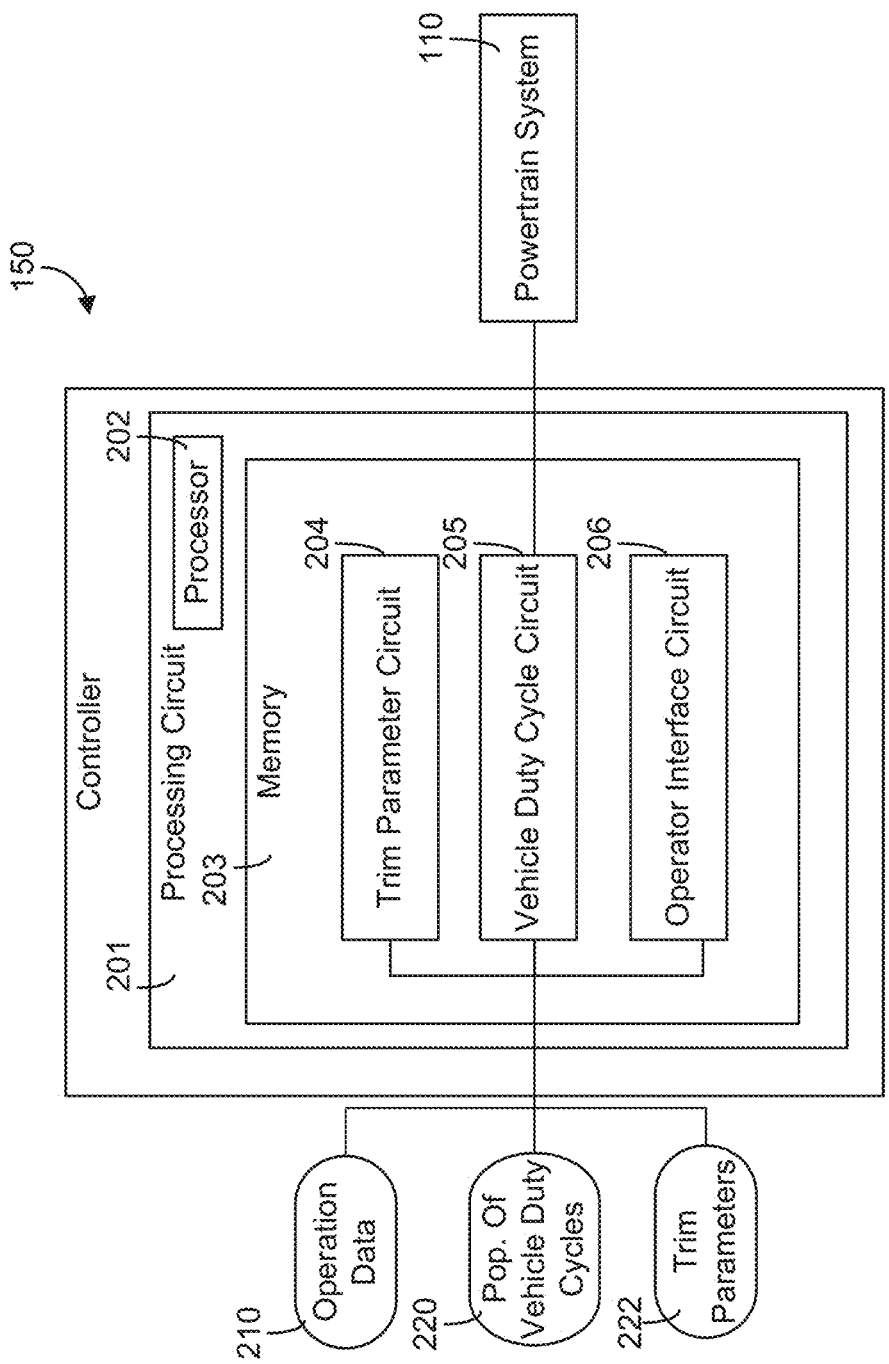
FIG. 2 is a schematic diagram of a controller of the vehicle of FIG. 1, according to an example embodiment.

Accordingly, referring now to FIG. 2, the function and structure of the controller 150 are shown according to one example embodiment. The controller 150 is shown to include a processing circuit 201 including a processor 202 and a memory 203. The processor 202 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 203 (e.g., NVRAM, RAM, ROM, Flash Memory, hard disk storage, etc.) may store data and/or computer code for facilitating the various processes described herein. Thus, the one or more memory devices 203 may be communicably connected to the controller 150 and provide computer code or instructions to the controller 150 for executing the processes described in regard to the controller 150 herein. Moreover, the one or more memory devices 203 may be or include tangible, non-transient volatile memory or non-volatile memory. Accordingly, the one or more memory devices 203 may include database components, object code components, script components, or any other type of information structure for supporting the various activities and information structures described herein.

The memory 203 is shown to include various circuits for completing the activities described herein. More particularly, the memory 203 includes a trim parameter circuit 204, a vehicle duty cycle circuit 205, and an operator interface circuit 206. The circuits 204-206 may be structured to determine one or more duty cycles for the vehicle 100, identify a desired duty cycle from a population of duty cycles stored by the vehicle tracking and analytics center 60, and selectively adjust one or more trim parameters for the vehicle 100 to coincide or substantially coincide with the trim parameters of the identified desired duty cycle. In one embodiment, the desired duty cycle may be based on a predefined desired operating parameter for the vehicle 100 (e.g., minimize fuel consumption, etc.). Accordingly and beneficially, the trim parameter adjustment may be based on operating data specific to the vehicle 100 in combination with determined duty cycles for a plurality of vehicles and subject to a desired operating characteristic of the vehicle 100. In this regard and advantageously, an operator may avoid complicated optimization processes and the time and cost that may otherwise be needed to tune one or more trim parameters for the vehicle 100. While various circuits with particular functionality are shown in FIG. 2, it should be understood that the controller 150 and memory 203 may include any number of circuits for completing the functions described herein. For example, the activities of multiple circuits may be combined as a single circuit, as additional circuits with additional functionality, etc. Further, it should be understood that the controller 150 may further control other vehicle activity beyond the scope of the present disclosure.

It should also be understood that while many of the processes described herein are in regard to the controller 150 of the vehicle 100, this illustration is for exemplary purposes only. In other embodiments, these processes (or some of these processes) may be performed by the vehicle tracking and analytics center 60. In yet other embodiments, the controller 150 may form a part of the telematics unit 130. Thus, many different configurations are possible without departing from the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The operator interface circuit 206 may be structured to facilitate and provide communications between (i) the controller 150 and an operator and (ii) the controller 150 and the vehicle tracking and analytics center 60. Accordingly, in one embodiment, the operator interface circuit 206 may include the operator input/output device 140. In another embodiment, the operator interface circuit 206 includes communication circuitry for facilitating the exchange of information between the controller 150 and the operator input/output device 140. In yet another embodiment, the operator interface circuit 206 includes machine-readable media and any combination of hardware (e.g., communication circuitry) for facilitating the exchange of information between the controller 150 and one or more of the operator input/output device 140 and the vehicle tracking and analytics center 60.

Through the operator interface circuit 206, an operator, fleet manager, and/or other responsible party may define a desired operating parameter for the vehicle 100. As described herein, the "desired operating parameter" or "desired operating characteristic" of the vehicle 100 refers to how an operator (or a fleet manager) would like their vehicle 100 to operate. For example, a desired operating parameter may be to minimize fuel consumption. As another example, a desired operating parameter may be to incrementally improve fuel economy. Incremental improvement may refer to a numerical increase (e.g., 8.2 miles-per-gallon (MPG) to 8.3 MPG is an incremental increase, etc.), to a predefined percent increase (e.g., one percent, two percent, ten percent, etc.), or any other metric understood by those of ordinary skill in the art to represent an incremental increase. In this regard, "incremental increase" may be a momentary occurrence (e.g., less than thirty seconds, etc.) or be required to exist for a predefined time period or distance (e.g., three minutes, five miles, etc.). As still another example, a desired operating parameter may be to improve an acceleration characteristic (i.e., remove or lower various fuel consumption trim parameters to enable an operator to receive a maximum or near maximum amount of acceleration when desired). As yet another example, a desired operating parameter may be to minimize or reduce a specific exhaust gas emissions characteristic (e.g., CO, NOx, etc.). As still another example, a desired operating parameter may be to reduce diesel exhaust fluid dosing in the exhaust aftertreatment system 120. Accordingly, the "desired operating parameter" is meant to be broadly interpreted, such that the aforementioned list is not meant to be exhaustive. Further and in some embodiments, more than one "desired operating parameter" may be utilized by the vehicle duty cycle circuit 205 (described below).

The trim parameter circuit 204 may be structured to receive one or more default trim parameters and implement the one or more default trim parameters with the vehicle 100 to control operation of the vehicle 100 with respect to the one or more default trim parameters. In one embodiment, reception of the one or more default trim parameters may be through a pre-programmed set of trim parameters based on the vehicular or engine application (e.g., a certain vehicle or engine may come standard with a certain set of default trim parameters). In another embodiment, the one or more default trim parameters may be received from a technician or operator (e.g., during a tune-up for the vehicle 100). As such, in one embodiment, the trim parameter circuit 204 may include communication circuitry (e.g., relays, a wire harness, etc.) that may facilitate the reception of the default trim parameters. In another embodiment, the trim parameter circuit 204 may include a controller, such as microcontroller, associated with a component that the trim parameter may at least partly control (e.g., a cruise control controller). In still another embodiment, the trim parameter circuit 204 may include machine-readable media that may be stored in the memory 203 and executable by the processor 202 for enabling reception of the default trim parameters. In yet another embodiment, the trim parameter circuit 204 may include any combination of communication circuitry and machine-readable media.

As mentioned above, the trim parameter circuit 204 may receive one or more trim parameters that control one or more operating points of the vehicle 100. An example of a trim parameter are cruise control upper droop and lower droop settings (i.e., "droops"). The upper droop setting may define how much the vehicle 100 is allowed to slow down on an uphill grade (e.g., X miles-per-hour relative to the defined cruise control set speed). The lower droop setting may define how much the vehicle 100 is allowed to speed up on a downhill grade (e.g., Y miles-per-hour relative to the defined cruise control set speed). Another example of a trim parameter is a road speed governor setting (i.e., "RSG"). The road speed governor setting defines a maximum road vehicle speed for the vehicle 100 (e.g., ninety miles-per-hour, eighty-five miles-per-hour, etc.). Still another example of a trim parameter is an idle shut down speed, which prescribes an allowed time duration for the engine operating in an idle mode before shut-down (e.g., three minutes, five minutes, one minute, etc.). Yet another example of a trim parameter is a vehicle acceleration management setting (i.e., "VAM" setting). The vehicle acceleration management setting may define a maximum acceleration rate of the vehicle. For example, during heavy load situations, the vehicle acceleration management setting may not be triggered. However, during light load situations, the vehicle acceleration management may restrain a maximum acceleration of the vehicle to mimic the acceleration of the vehicle as if the vehicle were in a heavy load situation in order to reduce fuel consumption. Still another example of a trim parameter is a gear down protection parameter setting (i.e., "GDP" setting). The gear down protection parameter setting may define a vehicle speed limit for transmission settings a predefined amount below a top transmission setting (e.g., two settings below the top setting, three settings below the top setting, etc.). By limiting the maximum vehicle speed in the transmission settings below a top setting, operators are encouraged to upshift, which may be beneficial due to the fuel economy savings in a top transmission setting versus a lower setting. However, and as described herein, the maximum vehicle speed allowed in the lower transmission setting may not be tailored or customized to the operator and vehicle 100, such that adjusting this setting may improve fuel economy of the vehicle. Yet another example of a trim parameter is a load based speed control setting (i.e., "LBSC" parameter setting). The load based speed control parameter setting may define a speed range (e.g., revolutions-per-minute (RPM), etc.) of the engine 101 in the lower transmission settings to meet or substantially meet the vehicle speed limits defined by the gear down protection parameter setting. In this regard, the load based speed control setting may be related to the gear down protection parameter setting.

It should be understood that the aforementioned list of trim parameters is not exhaustive, such that the present disclosure contemplates additional trim parameters that may also be applicable with the present disclosure.

While the default settings for the aforementioned trim parameters may at least partly improve performance of the vehicle 100, such as reduce fuel consumption, the default trim parameters are unrelated to how the vehicle 100 is operated by the particular operator or driver. Further and in this regard, a default trim parameter may not necessarily meet the desired operational characteristics of the operator. As explained herein below, the vehicle duty cycle circuit 205 may be structured to meet these objectives.

The vehicle duty cycle circuit 205 may be communicably coupled to each of the trim parameter circuit 204 and the operator interface circuit 206, and may be structured to identify or determine one or more duty cycles for the vehicle 100. To determine the one or more duty cycles of the vehicle 100, the vehicle duty cycle circuit 205 may receive or interpret operation data 210 regarding the vehicle 100 or a component thereof. As such, in one embodiment, the vehicle duty cycle circuit 205 may include one or more sensors (e.g., an engine speed sensor, an engine torque sensor, a NOx sensor, a particulate matter sensor, etc.) for acquiring and receiving the operation data 210. In another embodiment, the vehicle duty cycle circuit 205 may include communication circuitry (e.g., a wire harness, relays, etc.) that facilitates the exchange of information to receive the operation data 210 (and the data from the vehicle tracking and analytics center 60). In yet another embodiment, the vehicle duty cycle circuit 205 may include any combination of hardware (e.g., sensors and communication circuitry) and machine-readable media for performing the processes described herein.

As mentioned above, the vehicle duty cycle circuit 205 may interpret operation data 210 regarding operation of the vehicle 100 or a component thereof. The operation data 210 may include or provide an indication of any of the following: a vehicle speed, a current transmission gear/setting, a load on the vehicle/engine, a throttle position, a set cruise control speed, data relating to the exhaust aftertreatment system 120 (e.g., output power, engine speed, fluid consumption rate (e.g., NOx emissions, particulate matter emissions, and conversion efficiency of one or more catalysts in the system 120 (e.g., the selective catalytic reduction catalyst), etc.), fuel consumption rate, a diesel exhaust fluid consumption rate, any received engine/vehicle faults (e.g., a fault code indicating a low amount of diesel exhaust fluid), engine operating characteristics (e.g., whether all the cylinders are activated or which cylinders are deactivated, etc.), etc.

Based on the operation data 210, the vehicle duty cycle circuit 205 may determine a duty cycle for the vehicle 100. Beneficially, the determined duty cycle(s) is specific to the specific operating characteristics of the vehicle 100. As mentioned above, the "duty cycle" refers to a repeatable set of vehicle operations for a particular event or for a predefined time period. While many example formulas, algorithms, processes, and the like may be used to determine a duty cycle for the vehicle 100, an example set of processes is shown herein below and described in the paper entitled Parametric Modelling of Energy Consumption in Road Vehicles by A. Simpson (2005), which is incorporated herein by reference in its entirety:

$$\tilde{a} = \frac{\left(\sum_{j=1}^{N-1} \text{positive}\left(\frac{1}{2}(v_{j+1}^2 - v_j^2) + g(h_{j+1} - h_j)\right)\right)}{D} \quad (1)$$

$$v_{aero}^2 = \frac{\sum_{j=1}^{N-1} \overline{v_{j,J+1}^3} * \Delta t_{j,j+1}}{D} \quad (2)$$

With reference to Equations (1) and (2), Equation (1) represents the acceleration characteristic, ã, of the duty cycle while Equation (2) represents the aerodynamic speed, $v_{aero}^2$, of the duty cycle. For reference, the variables used in equations (1) and (2) are defined as follows:
v=vehicle speed;
t=time;
g=acceleration due to gravity;
j=sample time step; and
D=distance.

As such, the determined duty cycle is at least partly based on a time variant, which may be predefined, and a distance variant, which also may be predefined. Further and as shown, the duty cycle is two-dimensional, which may (i) facilitate relatively fast determinations and (ii) provide a relatively easy method for plotting/making determinations. It should be understood that the aforementioned process for determining a vehicle duty cycle is not meant to be limiting. The present disclosure contemplates other and additional processes that may be used to determine vehicle duty cycle, without departing from the scope of the present disclosure.

Figure 3:
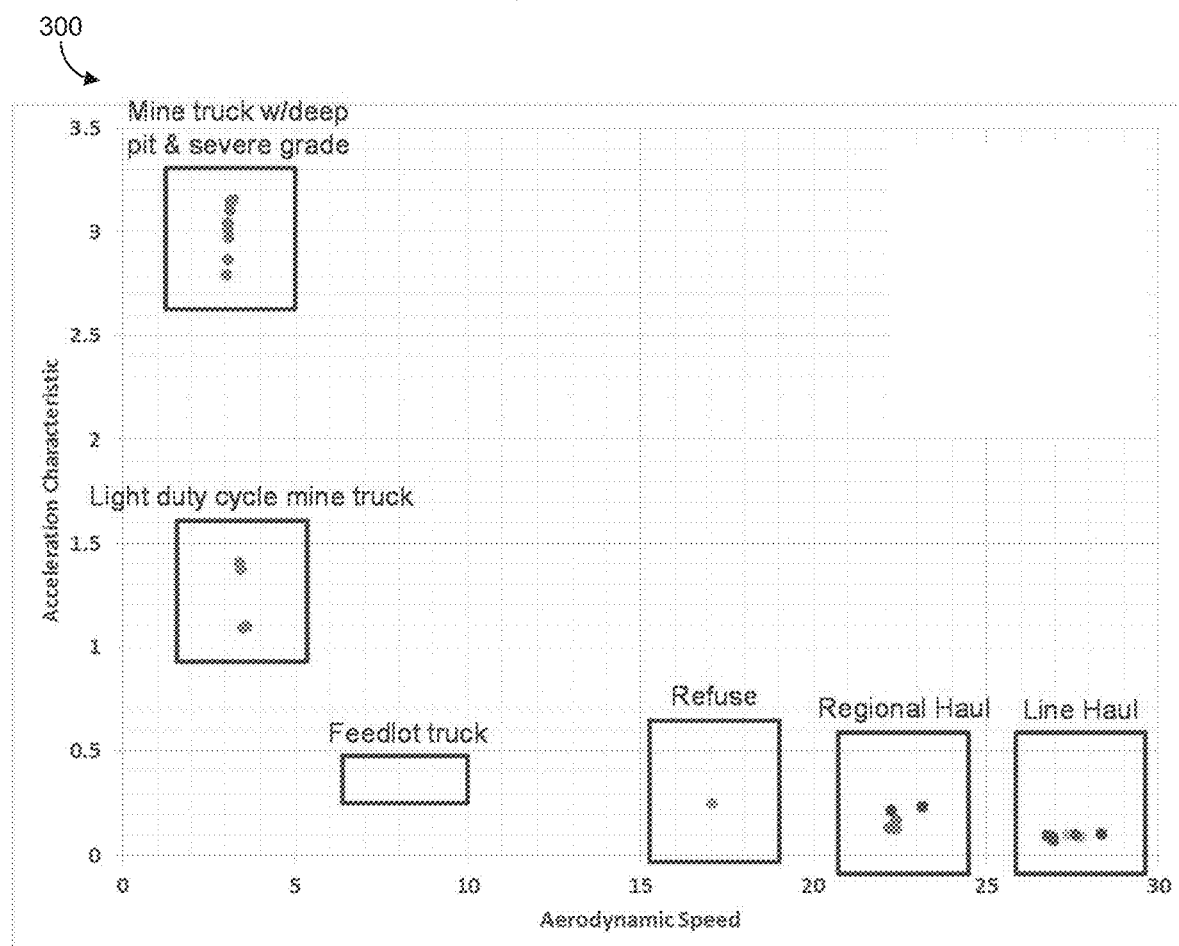
FIG. 3 is a graph of vehicle duty cycles for a variety of vehicles, according to an example embodiment.

In this regard and referring now to FIG. 3, a plot of duty cycles for a variety of vehicles is shown, according to one embodiment. As shown in graph 300, the acceleration characteristic may be the Y-Axis and be representative or indicative of a frequency of stop and go events, an amount of vehicle acceleration/deceleration, and vehicle hill climbing or descending (i.e., a potential energy variation). As also shown in graph 300, the aerodynamic speed may be the X-Axis and may be representative or indicative of an aerodynamic resistance to the vehicle 100 by either vehicle speed per se and/or an effect of wind resistance on the vehicle 100. Advantageously and as shown, the determined duty cycles may differ based on the type of vehicle (e.g., refuse truck versus light duty cycle mine truck). Each determined duty cycle may be provided to the vehicle tracking and analytics center 60 for storing the plurality of vehicle duty cycles in the vehicle duty cycle database 63. In this regard, graph 300 may represent a population of vehicle duty cycles 220.

Based on the foregoing, the vehicle duty cycle circuit 205 may identify multiple duty cycles for the vehicle 100. Such a determination may be based on at least one of setting the time constant to a predefined amount (e.g., one minute, etc.) and/or the distance constant to a predefined amount (e.g., five miles, etc.). Beneficially, by utilizing multiple duty cycles to characterize operation of the vehicle 100, optimization or improvement of one or more trim parameters may be applied on a relatively piecemeal basis to better capture the operational characteristics of the vehicle 100 (rather than on an overall basis, which may beneficially improve some operational characteristics, but may not be as tailored or granular than if applied over multiple duty cycles). Of course, in other embodiments, only one or a limited number of duty cycles may be utilized by the vehicle duty cycle circuit 205.

In one embodiment, each data point (i.e., the X-Axis and Y-Axis components described above using equations (1) and (2)) may represent a single duty cycle. In another embodiment, the vehicle duty cycle circuit 205 may clump, cluster, or otherwise group two or more data points into regions, sectors, or groupings to form a "representative vehicle duty cycle." In this regard, each group or cluster may represent a single vehicle duty cycle. Beneficially and to facilitate quick processing, the grouping process may be used by the vehicle duty cycle circuit 205.

Figure 4:
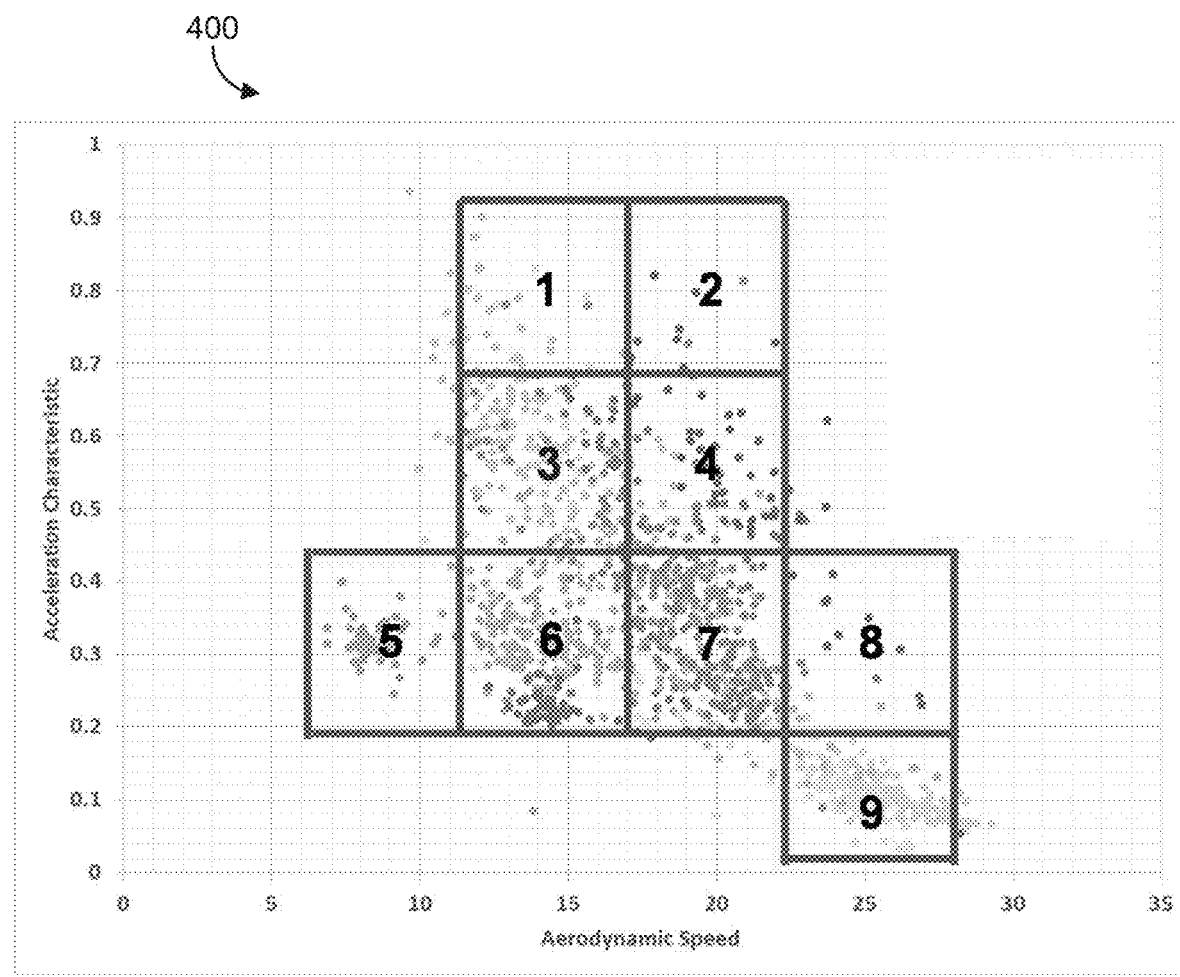
FIG. 4 is a graph of multiple representative duty cycles for a plurality of individual vehicle duty cycles, according to an example embodiment.

Referring now to FIG. 4, a graph of representative duty cycles is depicted, according to an example embodiment. In this regard, graph 400 follows the aforementioned description where a vehicle duty cycle may represent multiple data points and, as such, may be "representative." As shown, the vehicle duty cycle circuit 205 identified nine (9) duty cycles for a plurality of different vehicles, where each of the nine duty cycles represents a cluster of single duty cycle data points. In this example, the vehicle duty cycle circuit 205 utilized a hierarchical clustering analysis process to determine the set of nine vehicle duty cycles. In this regard, the vehicle duty cycle circuit 205 may define one or more boundaries for the received data and sample the received vehicle duty cycle data at a constant frequency for a predefined period of time to identify the one or more vehicle duty cycles. In other embodiments, any other process may be utilized to clump or cluster data points to generate one or more representative vehicle duty cycles. Thus, in other instances and based on at least one of the population as well as the clustering analysis used, more or less than nine representative duty cycles may be determined by the vehicle duty cycle circuit 205.

It should be understood that the clustering to form or determine representative duty cycles may be applied or used by the controller 150 and/or by the vehicle tracking and analytics center 60. For example, representative duty cycles may be used by the controller 150 to simplify or reduce the number of trim parameters that may be adjusted. In comparison, representative duty cycles may be used by the vehicle tracking and analytics center 60 to reduce the computational requirements for comparing the determined vehicle duty cycle (or a representative vehicle duty cycle) to representative duty cycles for the population 220. Thus, in one embodiment, the comparison (described below) may be implemented on a one-to-one basis: one determined vehicle duty cycle may be compared to each one of a plurality of vehicle duty cycles. In another embodiment, the comparison and identification process may be performed utilizing a grouping process to facilitate relatively faster determinations: compare a determined individual or representative vehicle duty cycle to the population of representative vehicle duty cycles. Thus, both iterations and variations thereof are intended to fall within the spirit and scope of the present disclosure.

After a determination of the duty cycle(s) for the vehicle 100, the vehicle duty cycle circuit 205 may be structured to compare the determined vehicle duty cycle(s) to a population of vehicle duty cycles 220. In this regard, the vehicle duty cycle circuit 205 may provide a request to the vehicle tracking and analytics center 60 and in response to the request being approved, the vehicle tracking and analytics center 60 may provide the population of vehicle duty cycles 220. In another embodiment, the population of vehicle duty cycles 220 may be stored or pre-programmed into the vehicle duty cycle circuit 205. This initial storage may be periodically updated to reflect new additions to the vehicle duty cycle database 63. Beneficially, this embodiment may be advantageous for quickly accessing the population of vehicle duty cycles 220 when network 51 access may be difficult.

In this regard and as alluded to above, the population of vehicle duty cycles 220 may include individual duty cycles for a plurality of vehicles and any information associated therewith (e.g., trim parameters 222, the effect of the duty cycle on various operating parameters, such as fuel economy, and the like). In some instances, the population of vehicle duty cycles 220 may be transformed into representative duty cycles to reduce bandwidth characteristics and facilitate relatively fast determinations.

Responsive to the comparison, the vehicle duty cycle circuit 205 may identify a desired vehicle duty cycle from the population of vehicle duty cycles 220 for each of the one or more determined vehicle duty cycles based on a desired operating parameter of the vehicle. As mentioned above, the "desired operating parameter" or "desired operating characteristic" of the vehicle 100 refers to how an operator (or a fleet manager) would like their vehicle 100 to operate. For example, a desired operating parameter may be to minimize fuel consumption. As another example, a desired operating parameter may be to improve an acceleration characteristic (i.e., remove or lower various fuel consumption trim parameters to enable an operator to receive a maximum or near maximum amount of acceleration when desired).

Comparing the determined vehicle duty cycle to the population of vehicle duty cycles 220 and identifying a desired vehicle duty cycle from the population may be implemented and performed in a variety of manners by the vehicle duty cycle circuit 205.

In one embodiment, the vehicle duty cycle circuit 205 may apply a filtering process to identify the desired vehicle duty cycle. This process may follow the one-to-one comparison process alluded to above. For example, from the population 220, the vehicle duty cycle circuit 205 may filter out or remove all vehicle duty cycle circuits that are not based on a similar vehicle (e.g., remove all stored vehicle duty cycles for refuse trucks when the vehicle 100 is a light-duty truck) or a similar component thereof (e.g., remove all stored vehicle duty cycles that have different types of engines than the engine 101). Subsequently, the vehicle duty cycle circuit 205 may isolate or otherwise identify the remaining vehicle duty cycles associated with the desired operating parameter (e.g., fuel consumption below are predefined standard). The vehicle duty cycle circuit 205 may then select the vehicle duty cycle that corresponds or appears to most correspond with the desired operating parameter subject to that duty cycle being within a predefined amount of the determined vehicle duty cycle (i.e., such that the two vehicle duty cycles correspond with a similar application (e.g., an uphill excursion)). In this regard, the "predefined amount" may mean any value that provides an indication of similar vehicle duty cycles. Accordingly, the "predefined amount" may take the form of an absolute value or any other metric that would be understood by those of skill in the art to be substantially close to the determined vehicle duty cycle.

Figure 5:
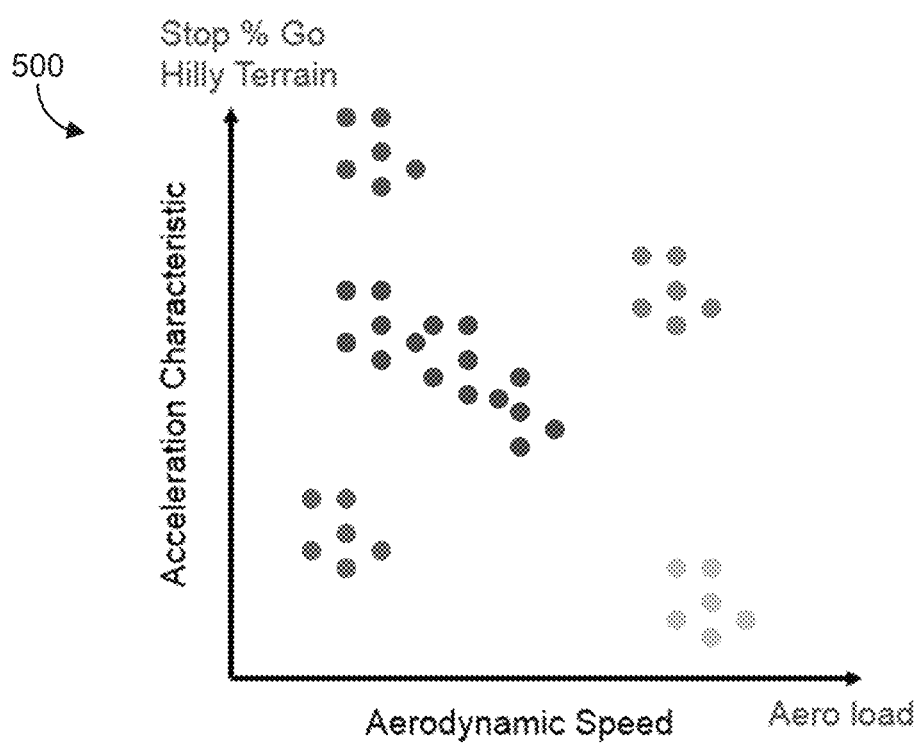
FIG. 5 is a graph of multiple vehicle duty cycles, according to an example embodiment.
Figure 6:
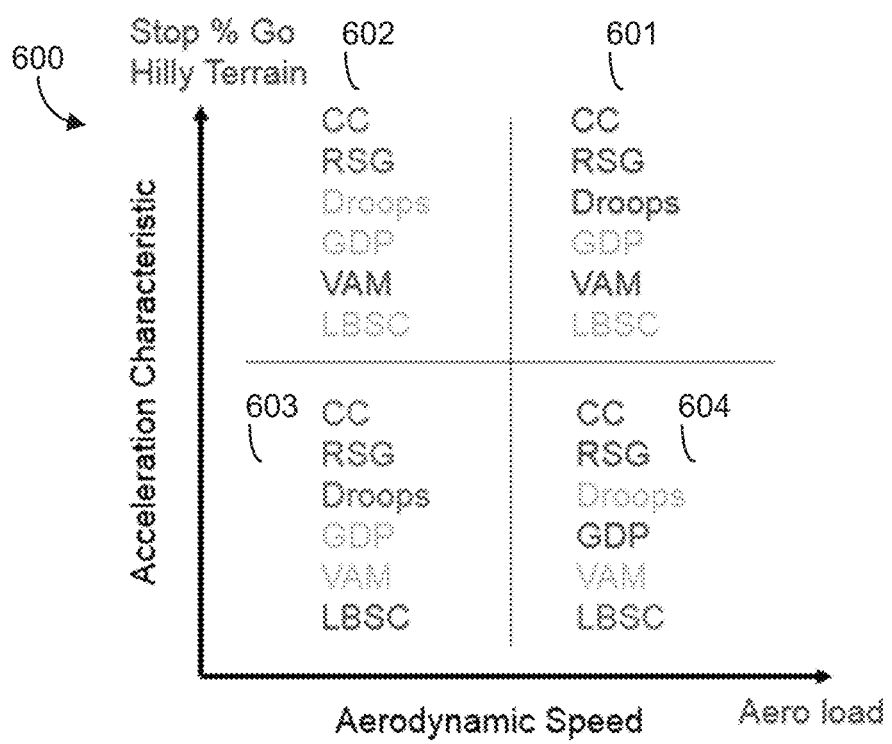
FIG. 6 is a graph of trim parameters that affect or most affect fuel consumption for the duty cycles of FIG. 5, according to an example embodiment.

In another embodiment, the vehicle duty cycle circuit 205 may utilize a relatively more streamlined process that is illustrated graphically in regard to FIGS. 5 and 6 to identify a desired vehicle duty cycle circuit. This process may be analogous or similar to the grouping process alluded to above. In this example, identification of the desired vehicle duty cycle circuit includes classification or categorization of the determined vehicle duty cycle or representative vehicle duty cycle to determine which trim parameters should or may potentially be adjusted. In the example of FIGS. 5 and 6, the desired operating parameter is to minimize fuel consumption. Graph 500 depicts a plurality of vehicle duty cycles, according to an example embodiment. Based on the experimental data, Applicant has determined areas of the two-dimensional graph indicative of vehicle duty cycles (using the X-Axis and Y-Axis data points) that may most affect fuel economy. As such, upon determination of an individual vehicle duty cycle or a representative vehicle duty cycle, this data may be compared to each region to determine where (i) the determined data is classified and, in response, (ii) what trim parameter settings may need to be adjusted.

In particular and as shown, graph 600 depicts the trim parameters that affect or most affect fuel consumption in each of the quadrants 601, 602, 603, and 604 for the plurality of vehicle duty cycles depicted in graph 500. In this regard, Applicant has determined the trim parameters that may mostly affect fuel consumption for duty cycles in or substantially in each of the depicted quadrants of graph 600. In particular, Applicant has determined that in quadrant 601 (high acceleration characteristic and high aerodynamic speed), the trim parameters that are most important to fuel economy are the cruise control setting, the road speed governor parameter setting, the cruise control droop parameter setting (i.e., upper/lower droop setting), and the vehicle acceleration management parameter setting. In quadrant 602 (high acceleration characteristic and low aerodynamic speed), Applicant has determined that the trim parameter that is most important to fuel economy is the vehicle acceleration management parameter setting. In quadrant 603 (low acceleration characteristic and low aerodynamic speed), Applicant has determined that the trim parameter that is most important to fuel economy is the load based speed control parameter setting. In quadrant 604 (low acceleration characteristic and high aerodynamic speed), Applicant has determined that the trim parameters that are most important to fuel economy are the cruise control parameter setting, the road speed governor parameter setting, and the gear down protection parameter setting. In this regard, modification or adjustment of these parameters (for the duty cycles that may be classified into these quadrants) may help to improve fuel economy for the vehicle 100.

It should be understood that in other embodiments, other trim parameters may be important. Further and as described above, "most important" is based on experimental evidence. In this regard, other parameters may also be important or affect fuel consumption; however, the aforementioned identified parameters may have a relatively greater affect. Of course, in other embodiments, for different vehicles, the identified important or most important parameters may vary greatly. Further, for different desired operating parameters, the identified important or most important parameters may also vary greatly. Thus, FIGS. 5 and 6 are not meant to be limiting. Moreover, in other embodiments, more or less than four quadrants or regions may be utilized.

Responsive to identification of a desired duty cycle from the population of duty cycles 220, the vehicle duty cycle circuit 205 may provide a request to the vehicle tracking and analytics center 60 to receive a set of trim parameters 222 associated with the identified desired duty cycle. Such a process follows the one-to-one comparison process described herein. At which point, the vehicle duty cycle circuit 205 may apply the received set of trim parameters with the vehicle 100. In some instances, the received set of trim parameters may be provided to the operator interface circuit 206 to enable an operator to selectively apply one or more of the received trim parameters with the vehicle 100.

In another embodiment and in accord with FIGS. 5 and 6, after determination of the vehicle duty cycle, the vehicle duty cycle circuit 205 may plot the vehicle duty cycle to determine which quadrant or sector associated with the vehicle duty cycle. The vehicle duty cycle circuit 205 may then readily identify which trim parameter(s) may need to be adjusted to improve or obtain a desired operating parameter. In this regard, the vehicle tracking and analytics center 60 may provide a graph (or look-up table, or model, or other representative of the graph 600), like the graph 600 to the controller 150, such that the vehicle duty cycle circuit 205 may readily reference that information to determine which trim parameter(s) should be or should not be adjusted. In some instances, ideal trim parameter settings (e.g., values) may be associated with each quadrant or sector. The ideal trim parameter setting may be an average, a median, or other representative value of the quadrant. Accordingly, upon classification of a vehicle duty cycle into the quadrant or sector, the vehicle duty cycle circuit 205 may readily identify the ideal trim parameter settings and compare those to the current trim parameter settings to determine which trim parameter settings may be or should be adjusted.

In either embodiment, after selective application of the trim parameters, the operator may realize an improvement of performance of the vehicle 100 in accordance with their identified desired operating parameter. Beneficially, such improvement may be made without having to take the vehicle 100 to a technician and based on their individual driving characteristics. Accordingly, the operator may realize time-savings, cost-savings, and operational improvement.

In certain embodiments, an affirmative response may be required from the operator prior to implementing the received trim parameters with the vehicle 100. In this regard, the operator may be the final decision maker. This may be beneficial for operators who desire to have relatively significant amounts of control over their vehicle 100.

Figure 7:
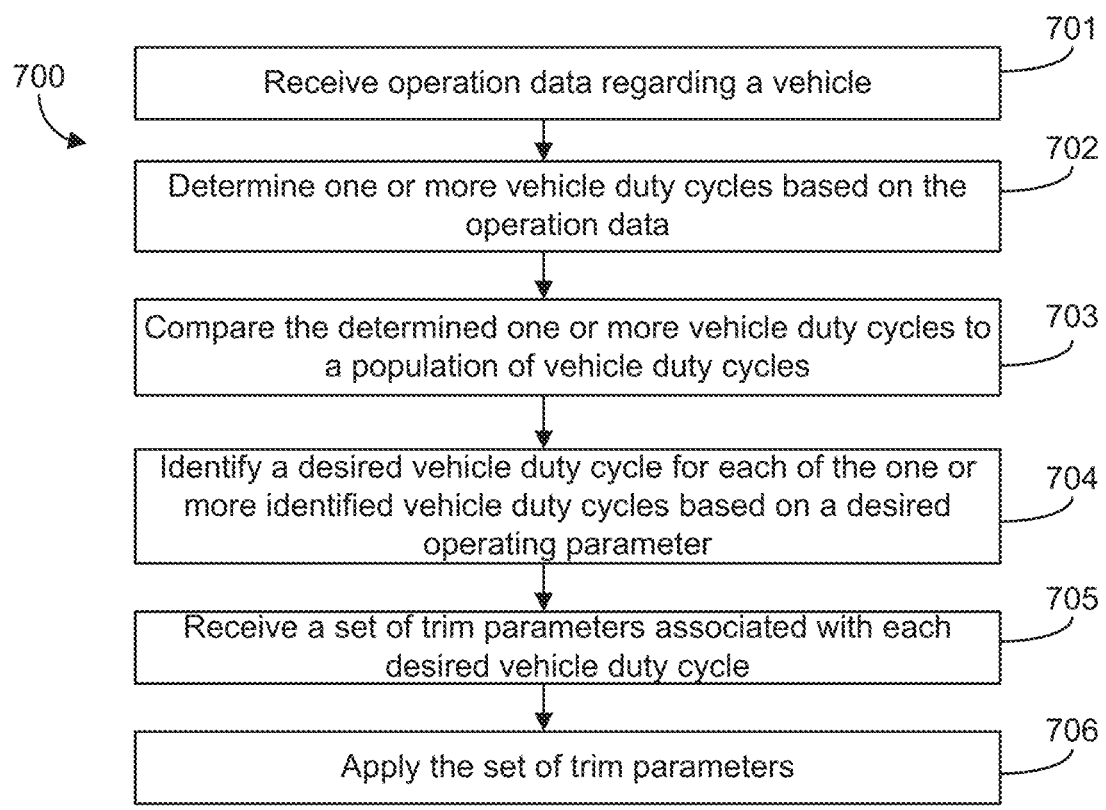
FIG. 7 is a flow diagram of a method of adjusting one or more trim parameters of a vehicle, according to an example embodiment.

Referring now to FIG. 7, a flow diagram of a method of adjusting one or more trim parameters of a vehicle is shown, according to one embodiment. Because method 700 may be implemented with the controller 150 and in the system 50, reference may be made to one or more features of the controller 150 and the system 50 to explain method 700.

At process 701, operation data regarding operation of a vehicle is received. The operation data may be indicative of how the vehicle is operated and, as such, may include the operation data 210. In this regard, the operation data may include, but is not limited to, data, values, information, and the like indicative of an engine speed, a vehicle speed, an engine torque, a fueling characteristic (e.g., amount, rate, etc.), an emissions characteristic (e.g., NOx emissions), whether any fault codes have been triggered, a tire pressure, an oil temperature, an oil pressure, a load on the vehicle, and the like. The operation data may be received by or acquired by the vehicle duty cycle circuit 205.

At process 702, one or more vehicle duty cycles are determined based on the operation data. In one embodiment, the vehicle duty cycle may be determined using Equation (1) and Equation (2), as shown and described herein above. Beneficially, using two equations may facilitate relatively fast determinations. The vehicle duty cycle determinations may occur periodically. In one embodiment, a vehicle duty cycle is determined daily based on the operation data acquired for that day. In another embodiment, the vehicle duty cycle is determined at a different time duration (e.g., half a day, weekly, etc.).

At process 703, the determined one or more vehicle duty cycles are compared to a population of vehicle duty cycles. In one embodiment, process 703 may be performed at the vehicle tracking and analytics center 60 by providing the one or more determined vehicle duty cycles from the controller 150 to the vehicle tracking and analytics center 60. In another embodiment, process 703 may be performed by the controller 150 itself. In this embodiment, the controller 150 may either store a population of vehicle duty cycles or selectively receive the population of vehicle duty cycles. For example, the controller 150 may provide an indication of the type of engine or vehicle associated with the controller 150 and then only receive a population of vehicle duty cycles that have that same or similar feature.

At process 704, a desired vehicle duty cycle for each of the one or more identified vehicle duty cycles is identified based on a desired operating parameter. As mentioned above, the desired operating parameter may refer to a desired operating characteristic of the vehicle, such as to incrementally improve fuel economy (e.g., obtain a one percent increase, etc.).

In one embodiment, the vehicle duty cycle circuit 205 may receive the population of vehicle duty cycles and apply a filtering process, like described above, to identify the vehicle duty cycles that are substantially close to the determined one or more vehicle duty cycles. The vehicle duty cycle circuit 205 may then receive the trim parameters for those vehicle duty cycles identified from the population (process 705) (i.e., the one-to-one process).

In another embodiment, the vehicle duty cycle circuit 205 may plot, graph, or otherwise categorize the determined vehicle duty cycles on a graph, like graph 600, and then determine how the trim parameters should be adjusted relative to defined "important" trim parameters (i.e., the grouping or clustering process). It should be understood, that the graph may be implemented as a look-up table or in any other format that facilitates quick or relatively quick retrieval and usage. This embodiment may be beneficial for quickly determining the relevant trim parameters for the specific vehicle that should be adjusted or may need to be adjusted.

In either of the two aforementioned embodiments, each generated vehicle duty cycle may be used or a representative duty cycle based on multiple generated vehicle duty cycles (see FIG. 4) may be used in processes 703 and 704.

At process 705, a set of trim parameters associated with each desired vehicle duty cycle is received. In this regard, the vehicle tracking and analytics center 60 may store or hold trim parameters associated with each duty cycle stored. In another embodiment, the vehicle duty cycle circuit 205 may utilize quadrants, like described above, where each quadrant (or section, region, area, etc.) may be associated with one or more trim parameter settings. In this regard, multiple models (e.g., graphs, look-up tables, etc.) may be used for each predefined desired operating parameter. This embodiment may be beneficial due to generating the trim parameters relatively quickly.

At process 706, the received trim parameters are applied with the vehicle. In one embodiment, all of the received trim parameters are applied with the vehicle. In another embodiment, less than all of the trim parameters may be applied with the vehicle. For example, during the comparison process, the vehicle duty cycle circuit 205 may determine which, if any, of the current trim parameters differ from the received trim parameters and adjust the trim parameters that differ.

The applied trim parameters may then at least partly control operation of the vehicle 100. For example, application of the trim parameters may define cruise droop settings for the vehicle (upper droop or lower droop). In another example, application of the trim parameters may define a road speed governor limit. Thus, application of the trim parameters may control the vehicle.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as processor 202 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. As also alluded to above, computer readable program code embodied on a computer readable signal medium may be transmitted using any appropriate medium, including but not limited to wireless, wireline, optical fiber cable, Radio Frequency (RF), or the like, or any suitable combination of the foregoing. In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
  a trim parameter circuit structured to receive a set of default trim parameters that are electronic operational parameters that control one or more operating points of a vehicle component or system; and
  a vehicle duty cycle circuit coupled to the trim parameter circuit, the vehicle duty circuit structured to:
    receive operation data indicative of a duty cycle for the vehicle, wherein the duty cycle is a substantially repeatable set of vehicle or vehicle component operations for a particular event or for a predefined time period;
    identify a desired vehicle duty cycle from a population of vehicle duty cycles based on the operation data indicative of the duty cycle for the vehicle and on a desired operating parameter of the vehicle;
    receive a set of trim parameters associated with the desired vehicle duty cycle; and
    control the one or more operating points of the vehicle component or system in accordance with the set of trim parameters.

2. The apparatus of claim 1, wherein the operation data indicative of the duty cycle for the vehicle includes an acceleration characteristic of the vehicle or an aerodynamic speed of the vehicle.

3. The apparatus of claim 1, further comprising an operator interface circuit structured to provide the set of trim parameters to an operator input/output device of the vehicle and responsive to receiving an affirmative implementation instruction from the operator input/output device, instruct the vehicle duty circuit to apply the set of trim parameters with the vehicle.

4. The apparatus of claim 1, wherein the vehicle duty cycle circuit is further structured to apply one or more boundaries for the received operation data and sample the received operation data at a predefined frequency for a predefined period of time to determine a vehicle duty cycle for the vehicle.

5. The apparatus of claim 4, wherein the vehicle duty cycle circuit is structured to use a hierarchical clustering process to define the one or more boundaries and to sample the received operation data to determine the vehicle duty cycle.

6. The apparatus of claim 1, wherein the desired operating parameter is to minimize fuel consumption for the vehicle.

7. The apparatus of claim 1, wherein the desired operating parameter is to incrementally improve fuel economy for the vehicle.

8. A method, comprising:
  receiving, by a controller of a vehicle, operation data indicative of a duty cycle for the vehicle, wherein the duty cycle is a substantially repeatable set of vehicle or vehicle component operations for a particular event or for a predefined time period;
  identifying, by the controller, a desired vehicle duty cycle from a population of vehicle duty cycles based on the operation data indicative of the duty cycle for the vehicle and on a desired operating parameter of the vehicle;
  receiving, by the controller, a set of trim parameters that are electronic operational parameters associated with the desired vehicle duty cycle; and
  controlling, by the controller, one or more operating points of the vehicle based on the set of trim parameters.

9. The method of claim 8, further comprising receiving, by the controller, additional data indicative of another duty cycle for the vehicle and determining a different vehicle duty cycle based on the additional data.

10. The method of claim 8, wherein the operation data indicative of the duty cycle for the vehicle includes an acceleration characteristic of the vehicle or an aerodynamic speed of the vehicle.

11. The method of claim 8, further comprising: providing, by the controller, the set of trim parameters to an operator input/output device of the vehicle; and
  applying, by the controller, the set of trim parameters with the vehicle in response to receiving an affirmative implementation instruction from the operator input/output device.

12. The method of claim 8, further comprising: applying, by the controller, one or more boundaries for the received operation data to sample the received operation data at a predefined frequency for a predefined period of time to determine a vehicle duty cycle.

13. The method of claim 12, further comprising using, by the controller, a hierarchical clustering process to define the one or more boundaries and to sample the received operation data to determine the vehicle duty cycle.

14. The method of claim 8, wherein the desired operating parameter is at least one of minimizing fuel consumption for the vehicle or incrementally improving fuel economy for the vehicle.

15. A system, comprising:
a controller coupled to an engine, the controller comprising a processor coupled to a non-transitory computer readable medium storing instructions that, when executed by the processor, cause the controller to:
receive operation data indicative of a duty cycle for a vehicle, wherein the duty cycle is a substantially repeatable set of vehicle or vehicle component operations for a particular event or for a predefined time period;
identify a desired vehicle duty cycle from the population of vehicle duty cycles based on the received operation data indicative of the duty cycle for the vehicle and on a desired operating parameter of the vehicle;
receive a set of trim parameters that are electronic operational parameters associated with the desired vehicle duty cycle; and
control one or more operating points of the vehicle based on the set of trim parameters.

16. The system of claim 15, wherein the operation data indicative of the duty cycle for the vehicle includes an acceleration characteristic of the vehicle or an aerodynamic speed of the vehicle.

17. The system of claim 15, wherein the instructions, when executed by the processor, further cause the controller to: apply one or more boundaries for the received operation data and sample the received operation data at a constant frequency for a predefined period of time to determine the vehicle duty cycle using a hierarchical clustering process to define the one or more boundaries and to sample the received operation data to determine the vehicle duty cycle.

18. The system of claim 15, wherein the desired operating parameter is at least one of minimizing fuel consumption for the vehicle or incrementally improving fuel economy for the vehicle.

19. The system of claim 15, wherein the instructions, when executed by the processor, further cause the controller to: communicate with a remote vehicle tracking and analytics center to receive at least one of the set of trim parameters or the population of vehicle duty cycles.

20. The system of claim 19, wherein the population of vehicle duty cycles received only pertains to the vehicle duty cycle for the vehicle.

* * * * *